(12) United States Patent
Tolbert et al.

(10) Patent No.: US 7,762,702 B2
(45) Date of Patent: Jul. 27, 2010

(54) LIGHT GUIDE DISPLAY SYSTEMS AND RELATED METHODS, SYSTEMS, AND COMPUTER PROGRAM PRODUCTS

(75) Inventors: William Haywood Tolbert, Malmo (SE); Stjepan Begic, Bunkeflostrand (SE)

(73) Assignee: Sony Ericsson Mobile Communications AB, Lund (SE)

( * ) Notice: Subject to any disclaimer, the term of this patent is extended or adjusted under 35 U.S.C. 154(b) by 191 days.

(21) Appl. No.: 11/545,246

(22) Filed: Oct. 10, 2006

(65) Prior Publication Data
US 2007/0236959 A1 Oct. 11, 2007

Related U.S. Application Data

(60) Provisional application No. 60/744,625, filed on Apr. 11, 2006.

(51) Int. Cl.
*F21V 8/00* (2006.01)
(52) U.S. Cl. .................. 362/551; 362/561; 362/330
(58) Field of Classification Search ................. 362/551, 362/24, 28, 29, 561, 511, 517, 330, 601, 362/616; 379/433.04, 433.06, 433.07; 385/901; 455/157.2, 159.1, 566; 349/61, 62, 64
See application file for complete search history.

(56) References Cited

U.S. PATENT DOCUMENTS

| | | | |
|---|---|---|---|
| 5,083,240 A | 1/1992 | Pasco | |
| 5,956,107 A * | 9/1999 | Hashimoto et al. | 349/64 |
| 5,963,280 A | 10/1999 | Okuda et al. | |
| 6,011,602 A * | 1/2000 | Miyashita et al. | 349/65 |
| 6,125,180 A * | 9/2000 | Lester et al. | 379/433.03 |
| 6,525,677 B1 * | 2/2003 | Printzis | 341/31 |
| 2002/0042291 A1 * | 4/2002 | Lahteenmaki et al. | 455/566 |
| 2006/0257090 A1 * | 11/2006 | Podolskiy et al. | 385/129 |

FOREIGN PATENT DOCUMENTS

| | | |
|---|---|---|
| GB | 1440048 | 6/1976 |
| JP | 11014835 | 1/1999 |
| WO | WO 2004/006214 A1 | 1/2004 |

OTHER PUBLICATIONS

International Search Report and Written Opinion for PCT/US2007/003172; date of mailing Jul. 10, 2007.

* cited by examiner

*Primary Examiner*—Sharon E Payne
(74) *Attorney, Agent, or Firm*—Myers Bigel Sibley & Sajovec (57) ABSTRACT

A light guide display system includes a display and a first light guide adjacent the display and having transmissive and nontranasmissive regions. The transmissive regions are configured to transmit light in a first pattern from the first light guide to the display. A second light guide is adjacent the first light guide opposite the display. The second light guide has transmissive and nontransmissive regions, and the transmissive regions of the second light guide are configured to transmit light from the second light guide through the first light guide and to the display in a second pattern.

25 Claims, 6 Drawing Sheets

LIGHT GUIDE DISPLAY SYSTEMS AND RELATED METHODS, SYSTEMS, AND COMPUTER PROGRAM PRODUCTS

RELATED APPLICATIONS

This application claims priority to U.S. Provisional Application Ser. No. 60/744,625, filed Apr. 11, 2006, the disclosure of which is hereby incorporated by reference in its entirety.

FIELD OF THE INVENTION

The present invention relates to the field of displays in general and, more particularly, to light guides for displaying multiple patterns, for example, on a mobile terminal.

BACKGROUND OF THE INVENTION

As consumer preferences and improved technology results in smaller electronic devices, the space available on electronic devices for displays and keypads and other user interfaces is increasingly limited. Keypads and touch sensitive screens have been engineered for space efficiency in these environments. However, the functionality and/or ease of use may be compromised in an effort to decrease the size of the user interface.

For example, portable or handheld devices, such as a mobile terminal, may provide various functionalities or operational modes, such as communication, games, and multi-media rendering. To decrease the number of user keys used in a keypad, a particular key may be used in connection with different functionalities depending on the operational mode. For example, in the communication mode, a single key may be used for entering a "1", whereas the same key in the multi-media mode may be used for initiating a "play" command for rendering multi-media data. A display may also be used to indicate which mode is active on the handheld device.

Multifunctional keys may be confusing to a user. Several symbols may need to be provided in a relatively small area. This may be a problem as the physical area available in a portable communication apparatus for each key is limited. As a result, the symbols may be relatively small and difficult to read. Furthermore, it may be difficult to distinguish the symbols from each other and/or be confusing for the user because the functionality of the key may be unclear.

SUMMARY

According to some embodiments of the present invention, a light guide display system includes a display and a first light guide adjacent the display and having transmissive and non-tranasmissive regions. The transmissive regions are configured to transmit light in a first pattern from the first light guide to the display. A second light guide is adjacent the first light guide opposite the display. The second light guide has transmissive and nontransmissive regions, and the transmissive regions of the second light guide are configured to transmit light from the second light guide through the first light guide and to the display in a second pattern.

In some embodiments of the present invention, the first and second patterns correspond to commands for respective first and second modes of operation on a handheld device. The first and second modes of operation may be selected from the group consisting of a camera mode, a keypad mode, a game mode, a music mode, an electronic messaging or text mode, and a news or informational service mode. The display may be a touch sensitive display on a handheld device.

In some embodiments of the present invention, at least one of the first and second light guides can include first and second portions connected to at least one light source, and the controller is configured to control the selective illumination of the first and second portions by the light source.

According to further embodiments, a controller is configured to selectively illuminate the first pattern of the first light guide and/or the second pattern of the second light guide. The other of the first and second light guide can include third and fourth portions connected to the at least one light source, and the controller is configured to control the selective illumination of the third and fourth portions by the light source. The first and second portions may be configured to illuminate to respective rows of commands on the display and the third and fourth portions may be configured to illuminate respective columns of commands on the display. The controller can be configured to highlight a command at an intersection between an illuminated row of commands and an illuminated column of commands.

According to still further embodiments of the present invention, the light guide system includes a divider between the first and second portions configured to reduce light leakage between the first and second portions.

In some embodiments, the display is provided by a surface portion of the first light guide.

According to further embodiments of the present invention, a portable electronic device includes a keypad including the light guide display system described above.

DETAILED DESCRIPTION OF EMBODIMENTS OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art.

Like numbers refer to like elements throughout. As used herein the term "comprising" or "comprises" is open-ended, and includes one or more stated elements, steps and/or functions without precluding one or more unstated elements, steps and/or functions. As used herein the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a "first" element, component, region, layer or section discussed below could also be termed a "second" element, component, region, layer or section without departing from the teachings of the present invention. The sequence of operations (or steps) is not limited to the order presented in the claims or figures unless specifically indicated otherwise.

Embodiments according to the present invention are described with reference to block diagrams and/or operational illustrations of methods, mobile terminals, and computer program products. It is to be understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor circuit of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

As used herein, a "mobile terminal" includes, but is not limited to, a terminal that is configured to receive communication signals via a wireless interface from, for example, a cellular network, a Wide Area Network, wireless local area network (WLAN), a GPS system, and/or another RF communication device. Example mobile terminals include, but are not limited to, a cellular mobile terminal; a GPS positioning receiver; an acceleration measurement device with a wireless receiver; a personal communication terminal that may combine a cellular mobile terminal with data processing, facsimile and data communications capabilities; a personal data assistance (PDA) that can include a wireless receiver, pager, Internet/intranet access, local area network interface, wide area network interface, Web browser, organizer, and/or calendar; and a mobile or fixed computer or other device that includes a wireless receiver.

As used herein, a "display" includes, but is not limited to, a device capable of providing a visual representation, such as graphics, lighting or back-lighting for displaying information and/or for aesthetic purposes.

Figure 1:
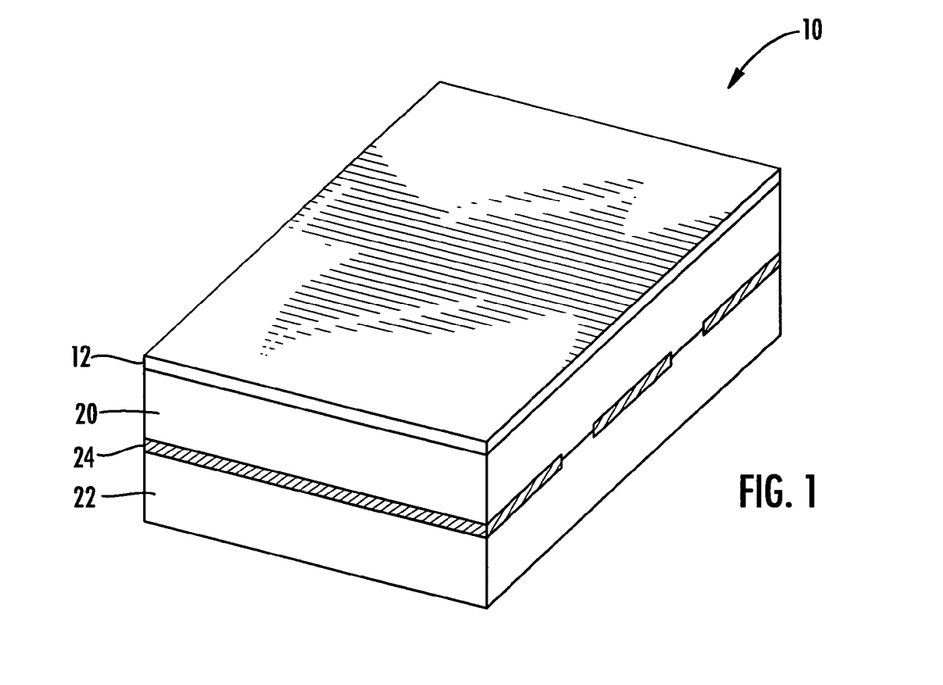
FIG. 1 is a partial cut-away perspective view of a display system according to some embodiments of the invention.
Figure 2:
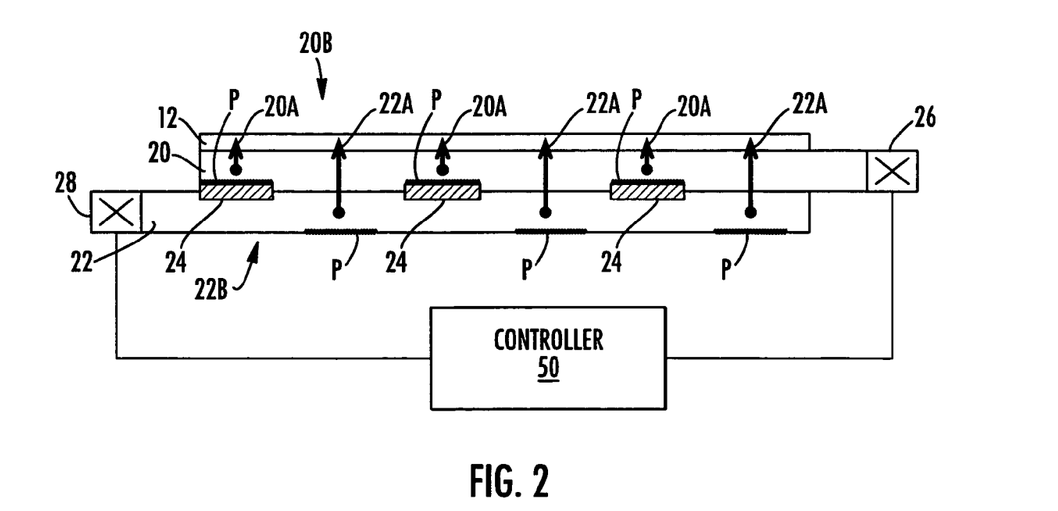
FIG. 2 is a cross-sectional view of the display system of FIG. 1.

With reference to FIG. 1, a display system 10 is shown. The display system 10 includes a display 12, two light guides 20, 22 and an optional reflective layer 24. As shown in FIG. 2, the light guides 20, 22 are connected to respective light sources, such as LEDs 26, 28. The light guides 20, 22 include respective transmissive regions 20A, 22A and non-transmissive regions 20B, 22B. The light guides 20, 22 can include patterned regions P on a side thereof that are transmissive, i.e., to form the transmissive regions 20A, 22A. A controller 50 is configured to control the illumination of the LEDs 26, 28. The optional reflective layer 24 can reduce light leakage between the light guides 20, 22. Accordingly, the light guide 20 is configured to transmit light in a pattern to the display 12, and the light guide 22 is configured to transmit light in another pattern through the light guide 22 and to the display 12.

Figure 3A:
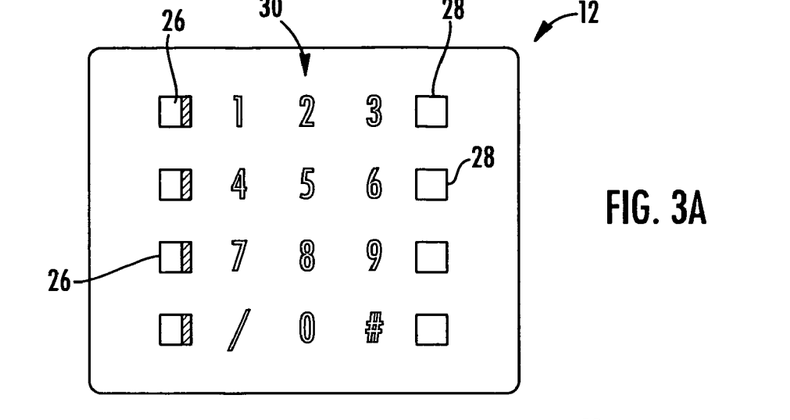
FIGS. 3A-3C are top views of a display from the display system of FIG. 1 illustrating various illumination patterns according to some embodiments of the invention.
Figure 3B:
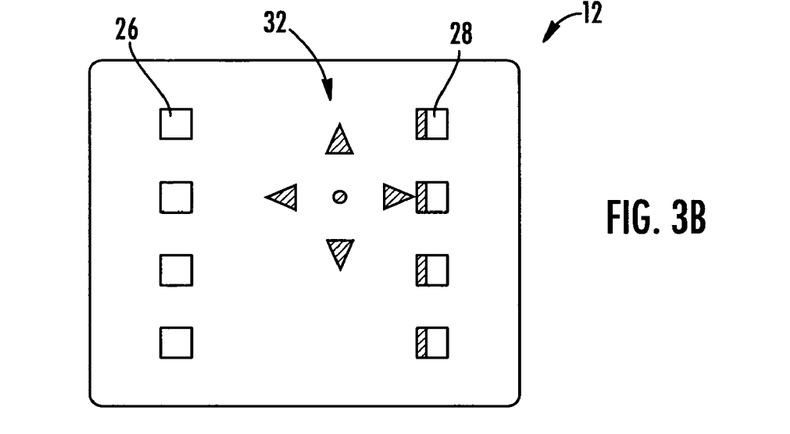
Figure 3C:
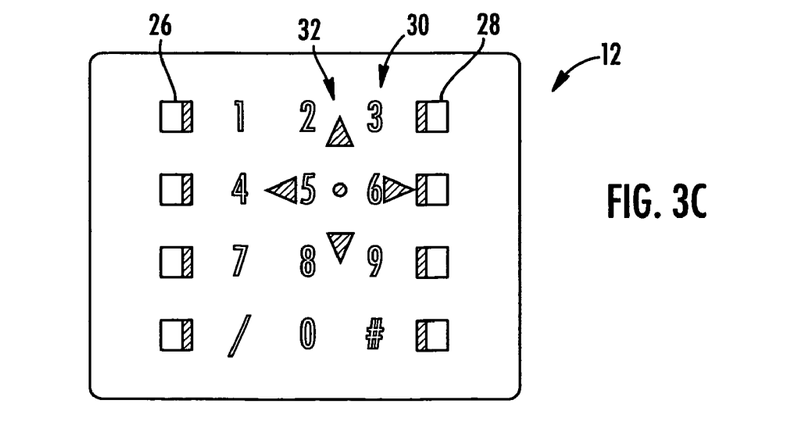

As shown in FIG. 3A, when the light guide 20 is illuminated by the LEDs 26, a pattern 30 including the transmissive regions 20A of FIG. 2 is illuminated on the display 12. When the light guide 22 is illuminated by the LEDs 28, another pattern 32 in FIG. 3B including the transmissive regions 22A is illuminated on the display 12. In FIG. 3C, both patterns 30, 32 are illuminated. In some embodiments, the transmissive regions 20A, 22A include a mask (not shown) in the shape of the patterns 30, 32 and positioned adjacent the display 12 and/or the light guides 20, 22 to focus and shape the light from the light guides 20, 22 to form the patterns 30, 32. In this configuration, the stacked light guides 20, 22 can illuminate respective patterns 30, 32 on the display 12. It should be understood that the LEDs 26, 28 are shown in FIGS. 3A-3C for illustrative purposes. For example, the LEDs 26, 28 may be positioned underneath the display 12 a shown in FIGS. 1-2 and may not be visible from the surface of the display 12.

In some embodiments, the patterns 30, 32 include illuminated command symbols that correspond to modes of operation in a handheld device, such as a cellular phone. For example, as shown in FIG. 3A, the pattern 30 can correspond to a phone mode of a handheld device to illuminate command symbols, such as a numbered keypad for dialing phone numbers. In FIG. 3B, the pattern 32 can correspond to a game mode of the same handheld device so that different command symbols (such as directional symbols) on the same keypad can be used to control the direction of a character in a video game. It should be understood that other modes of operation can be indicated by the illumination of other patterns, such as patterns that indicate a camera mode, a music mode, an electronic messaging or text mode, a news or informational service mode or other modes of operation suitable for a handheld device. For example, the user can select a mode of operation from a menu or control keys on the device, and the controller 50 of FIG. 2 can selectively illuminate the LEDs 26, 28 to illuminate one or more of the patterns 30, 32 corresponding to the selected mode of operation.

The light guides 20, 22 can be formed of any suitable material, including transparent and/or translucent plastic, elastomer materials, or glass. The LEDs 26, 28 may be single color or multi-color light sources, for example, so that the color of the light source may be controlled by the controller 50. Although embodiments according to the present invention are illustrated with respect to two light guides 20, 22, three or more light guides may be stacked to provide additional patterns on the display 12.

Figure 4:
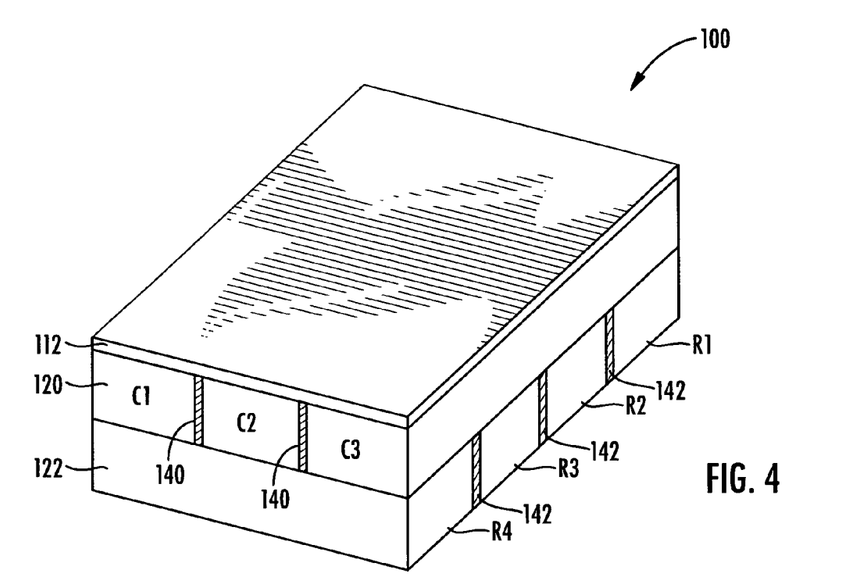
FIG. 4 is a partial cut-away perspective view of a display system according to some embodiments of the invention.
Figure 5:
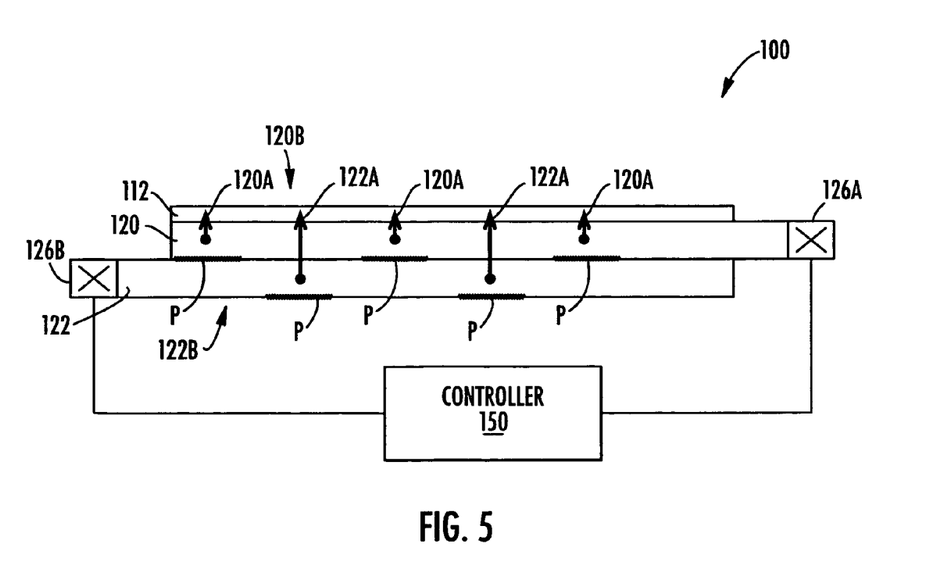
FIG. 5 is a cross-sectional view of the display system of FIG. 4.

The light guides 20, 22 shown in FIGS. 1-3 are stacked vertically; however, horizontal divisions may also be used. For example, as shown in FIGS. 4-5, a display system 100 includes a display 112 and light guides 120, 122. Slots 140, 142 separate portions, such as rows R1, R2, R3, R4 and columns C1, C2, C3, of the respective light guides 120, 122. Other suitable separators or reflectors for preventing and/or reducing light leakage between the 120, 122 may be used.

Figure 6A:
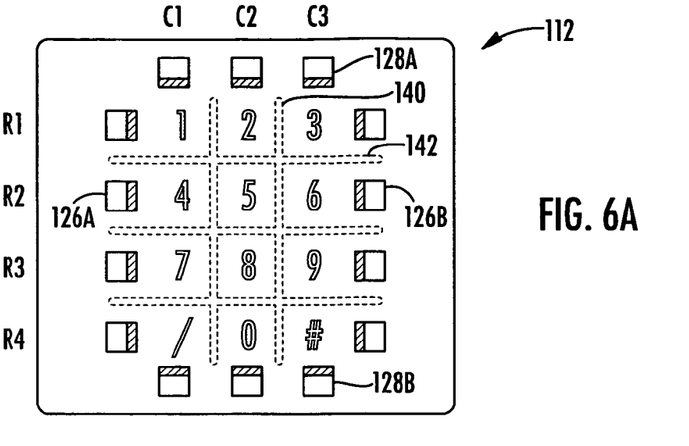
FIGS. 6A-6B are top views of a display from the display system of FIG. 4 illustrating various illumination patterns according to some embodiments of the invention.
Figure 6B:
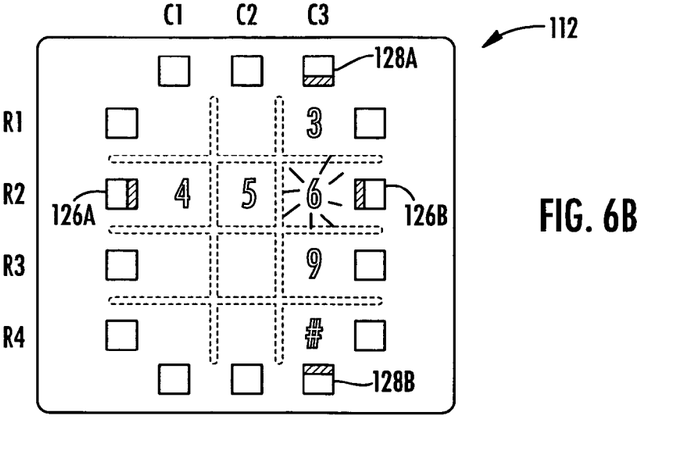

As shown in FIGS. 6A-6B, light sources, such as LEDs 126A, 126B, 128A, 128B are connected to the light guides 120, 122 to selectively illuminate rows R1, R2, R3, R4 and columns C1, C2, C3 on the display 112. The controller 150 of FIG. 5 can be configured to control the selective illumination of the rows R1, R2, R3, R4 and columns C1, C2, C3. As shown in FIG. 6A, all of the LEDs 126A, 126B, 128A, 128B are activated to illuminate all of the rows R1, R2, R3, R4 and columns C1, C2, C3. In FIG. 6B, the row R2 and the column C3 are illuminated so that the characters "3, 6, 9 and #" in the column C3 and "4, 5, and 6" in the row R2 are visible. Because the character "6" is at the intersection between the light guides of column C3 and row R2, the character "6" may be brighter than the other illuminated characters.

In this configuration, the LEDs 126A, 126B, 128A and 128B may be used to highlight a particular key at the intersection between illuminated rows in columns, for example, so that a user may be instructed to select a particular key to perform a function on a handheld device. As another example, the LEDS 126A, 126B, 128A and 128B can be used to highlight a particular key or group of keys responsive to a user input, such as to illuminate a key after it is selected by the user.

In some embodiments, the controller 150 (FIG. 5) can be used to selectively illuminate the rows R1, R2, R3, R4 and columns C1, C2, C3 for functional and/or aesthetic purposes. For example, multi-segmented, multi-colored, and/or timed light effects (such as effects timed with musical rhythms) can be provided on the display 112. The selective lighting can be used to highlight functional areas of the phone (e.g., a camera button during a camera mode or a sequence of keys to indicate how to perform a functions, such as a key unlock sequence) or to change icons or text in different modes of operation (e.g., numbers during calling mode, text during text entry mode, music player keys in music mode, camera control icons in camera mode).

Figure 6C:
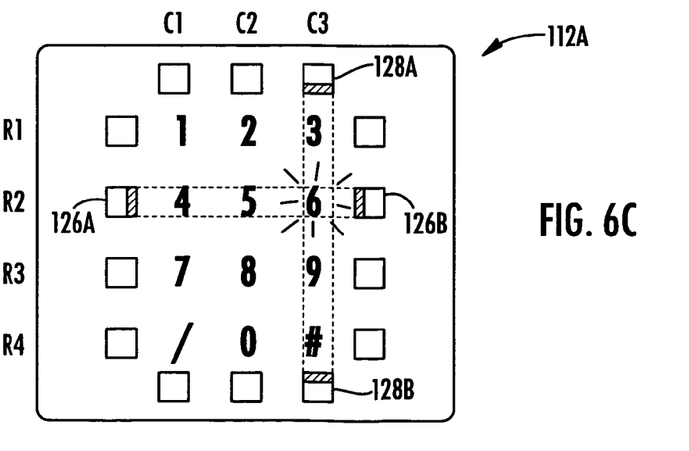
FIG. 6C is a top view of another display used with the display system of FIG. 4 illustrating an illumination pattern according to embodiments of the invention.

As shown in FIG. 6C, an alternative display 112A may be used that includes a printed, non-illuminated keypad pattern 130. The light guides 120, 122 can be used to provide backlighting to rows R1, R2, R3, R4 and columns C1, C2, C3 of the keypad pattern 130 on the display 112A. The backlighting of the keypad pattern 130 can be used to highlight a particular key (e.g., the character "6" as shown at the intersection of backlit column C3 and row R2) or for aesthetic purposes. For example, the pattern of lighting can be changed by the controller 150 to coincide with musical rhythms.

Although embodiments of the invention have been described with respect to LED light sources, it should be understood that other suitable light sources, such as LCDs, may be used. It should be understood that the display systems 10, 100 may be positioned in any suitable location on an electronic device, such as on a keypad, or on other locations without being confined to the space limitations of a keypad. The display systems 10, 100 can be positioned adjacent a keypad or incorporated into the buttons of a keypad.

Although embodiments of the invention have been illustrated with respect to the displays 12, 112, it should be understood that other configurations can be used. For example, a separate display may be omitted, and a display surface can be provided by a surface of one of the light guides, such as light guides 20, 120.

Although the rows R1, R2, R3, R4 and columns C1, C2, C3 are shown in FIGS. 4-5 as being formed in the light guides 120, 122 by slots 140, 142, it should be understood that other suitable configurations may be used. For example, separate light guides may be used in a substantially common horizontal plane to form the rows R1, R2, R3, R4 and columns C1, C2, C3. Various numbers of rows and/or columns can be formed. Moreover, the light guides 120, 122 may be divided into other shapes that can be selectively illuminated by various light sources. For example, diagonal shapes or non-linear shapes may be formed.

Although embodiments are shown with respect to light guides 20, 22 in FIGS. 1-2 and light guides 120, 122 in FIGS. 4-5, three or more light guides may be used without departing from the invention.

Figure 7:
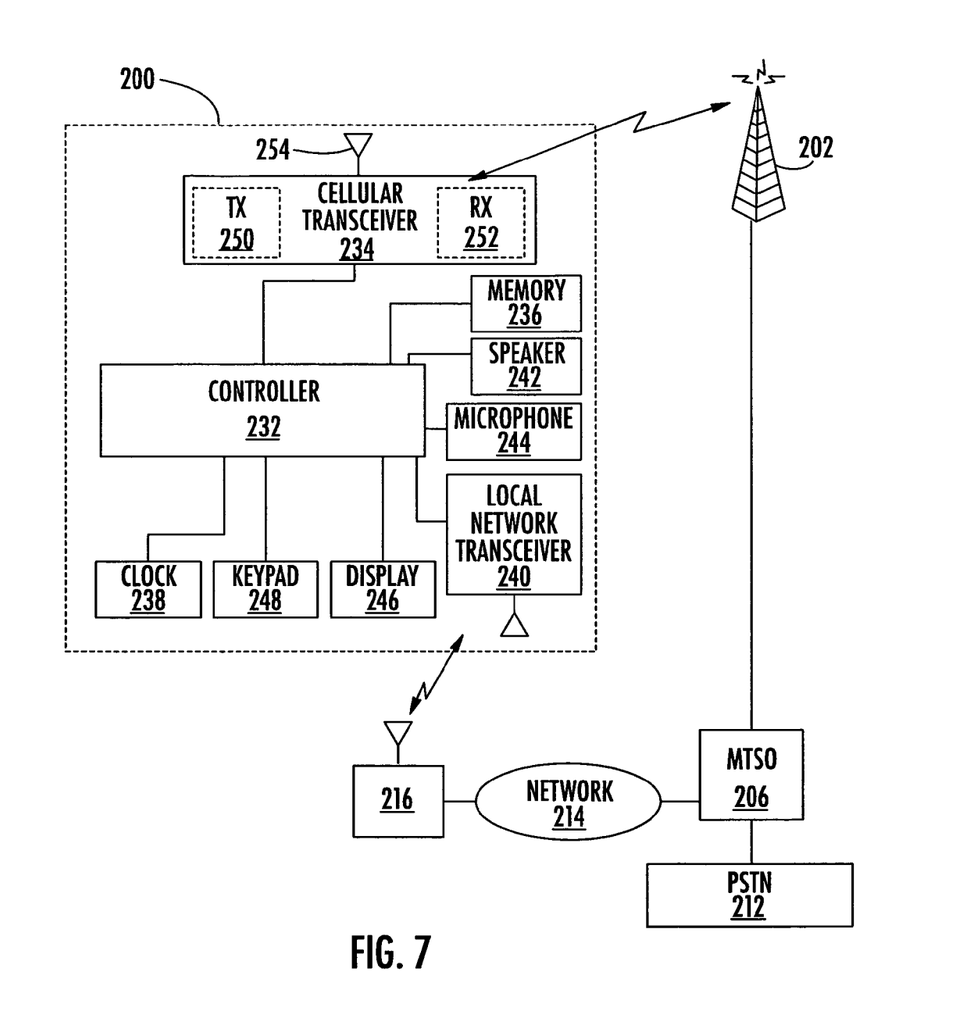
FIG. 7 is a schematic block diagram illustrating a wireless communication system with a wireless terminal according to some embodiments of the invention.
Figure 8:
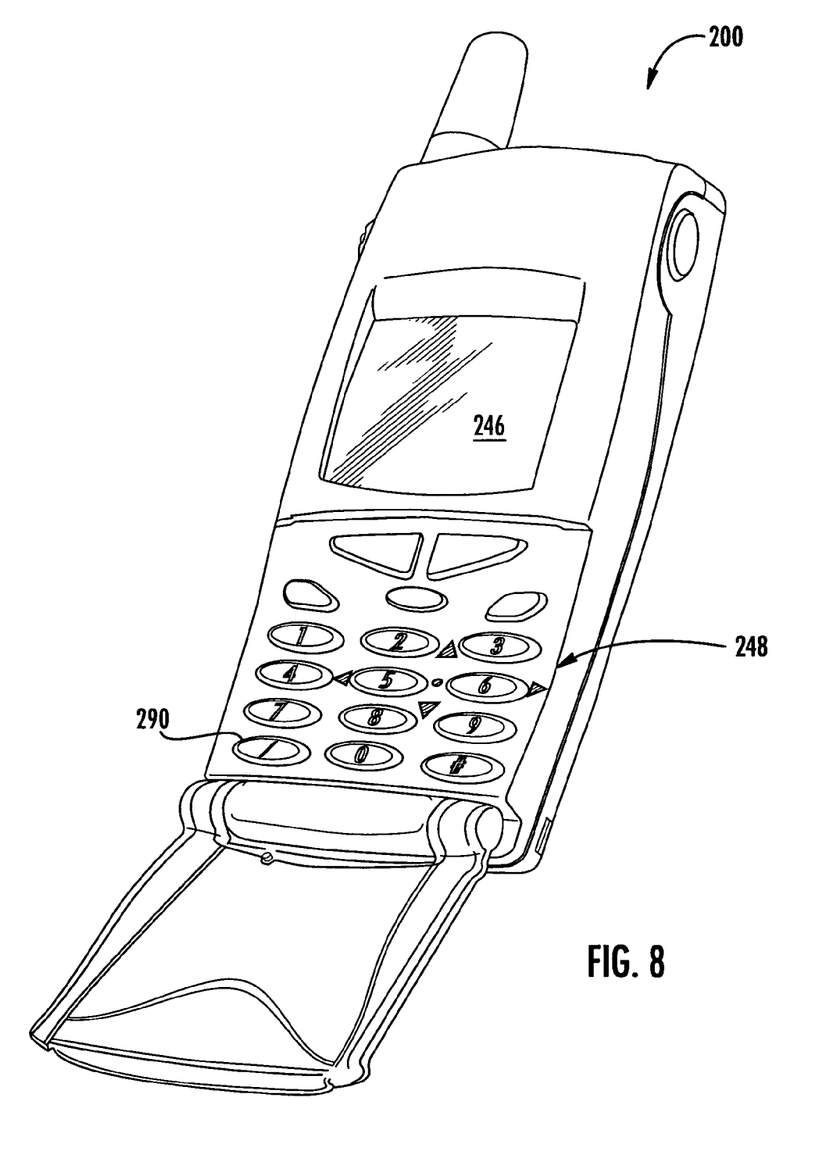
FIG. 8 is a front view of the wireless terminal of FIG. 7.

FIG. 7 is a schematic block diagram of a wireless communication system that includes a wireless terminal 200, such as a mobile wireless communications terminal, that receives wireless communication signals from a cellular base station 202 and/or a wireless local network 216. The cellular base station 202 is connected to a MTSO 206, which, in turn, is connected to a PSTN 212, and a network 214 (e.g., Internet). The mobile terminal 200 may communicate with the wireless local network 216 using a communication protocol that may include, but is not limited to, 802.11a, 802.11b, 802.11e, 802.11g, 802.11i, and/or other wireless local area network protocols. The wireless local network 216 may be connected to the network 214.

In some embodiments of the invention, the mobile terminal 200 includes a controller 232, a cellular transceiver 234, a memory 236, a timing circuit (clock) 238, a local network transceiver 240, a speaker 242, a microphone 244, a display 246 and a keypad 248. The display systems 10, 100 described herein may be used on the keypad 248 or other locations on the terminal 200, such as the display 246.

The memory 236 stores software that is executed by the controller 232, and may include one or more erasable programmable read-only memories (EPROM or Flash EPROM), battery backed random access memory (RAM), magnetic, optical, or other digital storage device, and may be separate from, or at least partially within, the controller 232. The controller 232 may include more than one processor, such as, for example, a general purpose processor and a digital signal processor, which may be enclosed in a common package or separate and apart from one another.

In particular, the controller 232 may be configured to control the activation of LEDs or LCDs to illuminate various images on a display system 10, 100 as described with respect to FIGS. 1, 2 3A-3C, 4, 5 and 6A-6C, for example, by selectively illuminating a light source and/or controlling a color of a light source. In some embodiments, the controller 232 may illuminate various images on a set of keys corresponding to a mode of operation for a device. For example, in a mobile terminal having a communications mode and a multi-media rendering mode, the controller 232 may illuminate images corresponding to the communications mode (e.g., telephone numbers) or images corresponding to the multi-media mode (e.g., commands such as "play," "volume," etc.) on a set of keys as desired by a user.

The cellular transceiver 234 typically includes both a transmitter (TX) 250 and a receiver (RX) 252 to allow two way communications, but the present invention is not limited to such devices and, as used herein, a "transceiver" may include only the receiver 252. The mobile terminal 200 may thereby communicate with the base station 202 using radio frequency signals, which may be communicated through an antenna 254. For example, the mobile terminal 200 may be configured to communicate via the cellular transceiver 234 using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and Universal Mobile Telecommunications System (UMTS). Communication protocols as used herein may specify the information communicated, the timing, the frequency, the modulation, and/or the operations for setting-up and/or maintaining a communication connection. In some embodiments, the antennas 228 and 254 may be a single antenna.

As shown in FIG. 7, the keypad 248 of the mobile terminal 200 can include button keys 290. In some embodiments, the keypad 248 can be a flat, touch-sensitive screen. The keypad 290 can be illuminated by the display systems 10, 100 to illuminate the keys 290 and/or regions adjacent the keys 290 as described herein.

Although embodiments according to the current invention have been described with respect to the display systems 10, 100 and the mobile terminal 200, it should be understood that the display systems 10, 100 described herein may be used in any suitable electronic device using a display and/or keypad, including button keys and/or touch sensitive screens. The display systems 10, 100 can also be used on the mobile terminal 200 for buttons or keys other than those on the keypad 248. Moreover, embodiments according to the current invention are not limited to any particular size or display environment and may be used in other displays or signs as would be understood by those of skill in the art.

Although embodiments according to the current invention have been described with respect to an LED or LCD that provides light to a light guide, it should be understood that other configurations may be used, including configurations using optical switches to selectively provide light to an array of light guides.

The foregoing is illustrative of the present invention and is not to be construed as limiting thereof. Although a few exemplary embodiments of this invention have been described, those skilled in the art can readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A light guide display system comprising:
a display;
a first light guide adjacent the display and having transmissive and nontransmissive regions, wherein the transmissive regions are configured to transmit light in a first pattern from the first light guide to the display; and
a second light guide adjacent the first light guide opposite the display, the second light guide having transmissive and nontransmissive regions, wherein the transmissive regions of the second light guide are configured to transmit light from the second light guide through the first light guide and to the display in a second pattern,
wherein the first and second light guides are formed of a transparent and/or translucent material, the first pattern illuminates a first region of the display and the second pattern illuminates a second region of the display, and the first region is different than the second region of the display.

2. The display system of claim 1, wherein the first and second patterns correspond to commands for respective first and second modes of operation on a handheld device.

3. The display system of claim 2, wherein the first and second modes of operation are selected from the group consisting of a camera mode, a keypad mode, a game mode, a music mode, an electronic messaging or text mode, and a news or informational service mode.

4. The display system of claim 2, wherein the display is a touch sensitive display on a handheld device.

5. The display system of claim 1, further comprising a controller configured to selectively illuminate the first pattern of the first light guide and/or the second pattern of the second light guide.

6. The display system of claim 5, wherein at least one of the first and second light guides includes first and second portions connected to at least one light source, and the controller is configured to control the selective illumination of the first and second portions by the light source.

7. The display system of claim 6, wherein the other of the first and second light guides includes third and fourth portions connected to the at least one light source, and the controller is configured to control the selective illumination of the third and fourth portions by the light source.

8. The display system of claim 7 wherein the first and second portions are configured to visibly illuminate respective rows of commands on the display and the third and fourth portions are configured to visibly illuminate respective columns of commands on the display.

9. The display system of claim 8, wherein the controller is configured to highlight a command at an intersection between visibly illuminated row of commands and an illuminated column of commands.

10. The display system of claim 1, further comprising a divider between the first and second portions configured to reduce light leakage between the first and second portions.

11. The display system of claim 1, wherein the display is provided by a surface portion of the first light guide.

12. The display system of claim 1, wherein the controller is configured to highlight a command at an intersection between an illuminated row of commands and an illuminated column of commands.

13. The display system of claim 1, wherein the first pattern and the second pattern are different.

14. A portable electronic device comprising:
a keypad including a light guide display system, the light guide display system including:
a display;
a first light guide adjacent the display and having a first pattern of transmissive and nontranasmissive regions, wherein the transmissive regions are configured to transmit light from the first light guide to the display; and
a second light guide adjacent the first light guide opposite the display, the second light guide having a second pattern of transmissive and nontransmissive regions, wherein the transmissive regions of the second light guide are configured to transmit light from the second light guide through the first light guide and to the display,
wherein the first and second light guides are formed of a transparent and/or translucent material, the first pattern illuminates a first region of the display and the second pattern illuminates a second region of the display, and the first region is different than the second region of the display.

15. The device of claim 14, wherein the first and second patterns correspond to commands for respective first and second modes of operation on the handheld device.

16. The device of claim 15, wherein the first and second modes of operation are selected from the group consisting of a camera mode, a keypad mode, a game mode, a music mode, an electronic messaging or text mode, and a news or informational service mode.

17. The device of claim 15, wherein the display is a touch sensitive keypad display.

18. The device of claim 14, further comprising a controller configured to selectively illuminate the first pattern of the first light guide and the second pattern of the second light guide.

19. The device of claim 18, wherein at least one of the first and second light guides includes first and second portions connected to at least one light source, and the controller is configured to control the selective illumination of the first and second portions by the light source.

20. The device of claim 19, wherein the other of the first and second light guides includes third and fourth portions connected to the at least one light source, and the controller is configured to control the selective illumination of the third and fourth portions by the light source.

21. The device of claim 20, wherein the first and second portions are configured to visibly illuminate respective rows of commands on the display and the third and fourth portions are configured to visibly illuminate respective columns of commands on the display.

22. The device of claim 21, wherein the controller is configured to highlight a command at an intersection between visibly illuminated row of commands and an illuminated column of commands.

23. The device of claim 19, further comprising a divider between the first and second portions configured to reduce light leakage between the first and second portions.

24. The device of claim 14, wherein the display is provided by a surface portion of the first light guide.

25. The device of claim 14, wherein the first pattern and the second pattern are different.

* * * * *